Jan. 3, 1956

O. F. SLABY 2,729,026

SELF-STEERING VEHICLE

Filed Jan. 20, 1950

INVENTOR.
Ollie F. Slaby
BY Robb & Robb
Attorneys.

Jan. 3, 1956  O. F. SLABY  2,729,026
SELF-STEERING VEHICLE
Filed Jan. 20, 1950  2 Sheets-Sheet 2

INVENTOR.
Ollie F. Slaby
BY Robbs Robb
Attorneys.

United States Patent Office 2,729,026
Patented Jan. 3, 1956

2,729,026

SELF-STEERING VEHICLE

Ollie F. Slaby, Parma, Ohio

Application January 20, 1950, Serial No. 139,537

5 Claims. (Cl. 46—213)

My present invention comprises novel variable self-steering means for self-propelled vehicles.

One of the objects of the invention is to provide a self-propelled vehicle which will move in a devious and constantly changing path, which may be embodied either in a toy vehicle or in a passenger carrying vehicle for amusement purposes and because of the variable and devious path of movement will create considerable interest and provide amusement for either children or adults.

Another object of my invention is to provide a self-propelled vehicle of the type mentioned having variable self-steering means of relatively simple construction and inexpensive to manufacture.

A further object of the invention is to provide a self-propelled vehicle of the type referred to having self-steering means including alternatively usable steering control elements by which the devious courses or paths of movement of the vehicle may be predetermined and varied in an infinite variety of ways.

In carrying the invention into practice I provide a self-propelled vehicle having steerable running gear that is steerably pivoted to turn about a vertical axis and includes a yoke member rigid therewith, and a power driven rotatable steering control member arranged to coact with the fork members of the yoke extension of the steerable running gear to cause turning of the steerable running gear about the vertical axis thereof in different directions to create a devious pattern of movement of the vehicle controlled by the particular construction of the rotatable control member. According to my invention, I further provide alternatively usable rotatable steering control members of different designs and I provide means whereby any one of such control members may be readily mounted on the vehicle by very simple procedure so that the pattern of movement of the vehicle can be varied as desired to provide an almost infinite variety of such patterns of movement of the self-propelled vehicle.

The invention further contemplates the provision of novel wheel construction and novel mounting of the wheels of the driving running gear, whereby the wheels will be normally driven from the power source but if the vehicle meets with an obstacle in the course of its movement, the axle carrying the driving wheel will turn without rotating said driving wheel.

Other objects, advantages and features of the invention will appear from the following detailed description taken in conjunction with the accompanying drawings in which.

Figure 3:
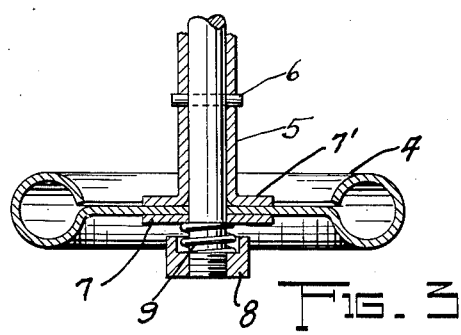
Figure 3 is an enlarged sectional view showing the novel wheel mounting of the driving traction wheel.

Now referring to the drawings, the numeral 1 designates the body of the toy automotive vehicle which may be fabricated from any suitable sheet material, according to usual practice. The vehicle frame or chassis is generally designated by the numeral 2 and comprises suitably arranged frame members carrying the various motor means, associated shafts, gearing, and the running gear. At the rear end of the frame or chassis 2 is mounted the rear running gear comprising the rear driving axle 3 carried by the frame and rotatable relative thereto. On each end of the axle 3 there are provided the wheels 4, each mounted to freely rotate on the axle 3. On each end of the axle, at the inner sides of each wheel is a sleeve 5 pinned to the axle 3 by means of a pin 6 and said sleeves 5 each have an annular flange 7' which abuts against the inner face of the wheel 4, as shown in Figure 3.

On each end of the axle at the outer side of each wheel there is provided an annular plate or washer 7 which contacts with the outer face of the wheel 4. At each end of the axle 3 is a hub cap 8 which is mounted to screw on the end of the axle and between the hub cap 8 and the washer 7 there is interposed a coil spring 9.

The object of the wheel mounting just described is to provide frictional engagement between the wheels 4 and the axle 3 in normal condition so that the wheels 4 will normally turn with the axle 3 but if the vehicle meets with an obstacle in the course of its movement, then the axle 3, which is driven from the power source, will turn without rotating the wheels.

Any suitable means, such as an electrical or spring driven motor may be mounted on the chassis for propelling the vehicle. In the drawings there is illustrated a spring driven motor or clock-work device which comprises a spring 10 mounted in the usual manner and carried by the chassis 2, which spring 10 may be put under tension by the usual winding device or key 11. The spring is coupled in the usual manner with a gear 12 which through a suitable train of gears, generally indicated by the numeral 13, transmits rotary motion to the shaft 3 to drive the same and the wheels 4 carried thereby for propelling the vehicle.

The front running gear is steerably mounted and comprises the steerable axle carrying beam 14 which has depending flanges 15 at each end through which the front axle 16 extends. The front wheels 17 are suitably mounted at opposite ends of the axle 16.

The axle carrying beam 14 is steerably pivoted by means of a pivot pin 18 connected to a front frame extension 19 at a point centrally between the sides of the frame, and said pin 18 being connected to the axle carrying beam 14 at a point centrally between the wheels 17.

Extending rearwardly from the axle carrying beam 14 is a yoke shaped extension rigidly secured to the beam 14 and having transversely spaced fork extensions 20. The extensions 20 are spaced transversely of the frame or chassis 2; that is, transversely with respect to the direction of movement of the vehicle.

In the front end of the frame and extending transversely thereof is mounted a shaft 21 on one end of which is fixed a gear 22 arranged to mesh with gearing 23 drivingly connected with the motor actuated gear 12 through suitable gearing carried by a countershaft 24, whereby the shaft 21 is operatively connected with the motor 10 for rotation of the shaft 21.

Figure 2:
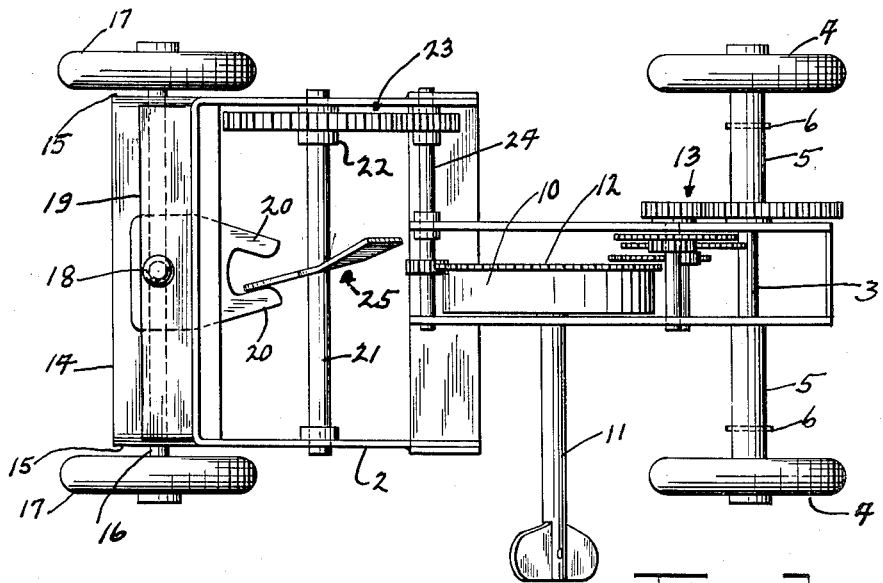
Figure 2 is a top plan view of the chassis only of the vehicle illustrated in Figure 1.

A rotatable steering control member generally designated by the numeral 25 is fixed to the shaft 21 for rotation therewith. The rotatable steering control member 25 extends between the spaced fork extensions 20, as seen best in Figure 2, and has parts extending transversely of the center of rotation thereof, said parts being arranged to coact periodically with one or the other of said extensions 20 during rotation of said control elements 25 to steerably move the front running gear about the vertical axis of the pivot pin 18.

Figure 1:
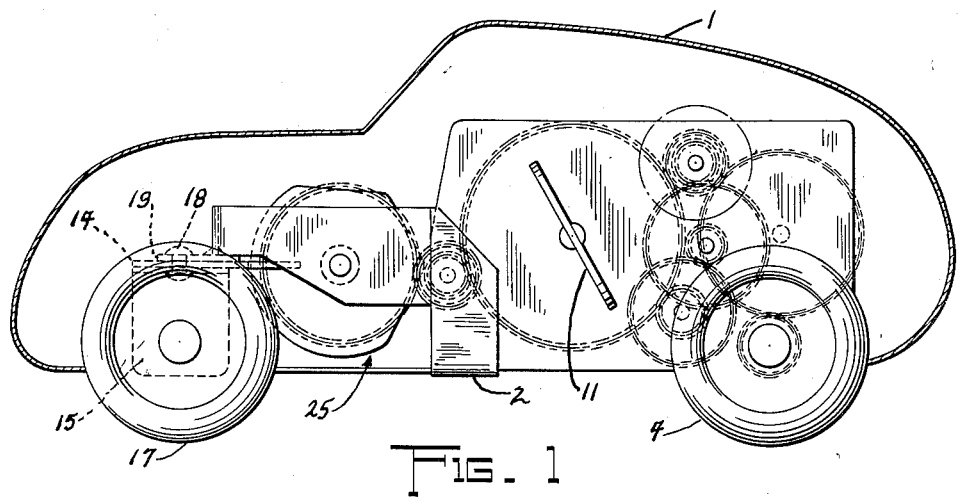
Figure 1 is a longitudinal sectional view of a complete toy vehicle embodying my invention.
Figure 8:
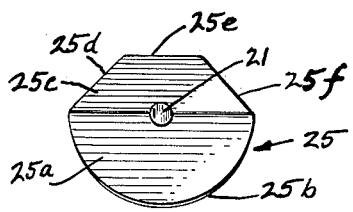
Figure 8 is a view showing another modification of the rotatable steering control element and its shaft mounting, looking toward the end of the shaft.
Figure 9:
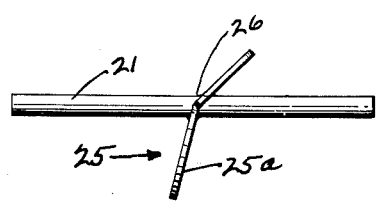
Figure 9 is a view taken at right angles to the showing of Figure 8.

The rotatable steering control element 25 shown in Figure 1, is exemplary of one of various forms of such elements that may be used or embodied in the steering means according to my invention. The rotatable steering control element 25 is illustrated in Figures 8 and 9 also. As shown in the latter figure, the control member or element 25 may be fabricated of flat sheet metal and formed with a portion 25a extending from one side of the axis of the shaft 21, said portion 25a being provided with a curved periphery 25b. The element 25 is so mounted on the shaft 21 as to dispose the part 25a in laterally offset relation to the center of rotation of said element, as seen best in Figures 2 and 9, the center of rotation being indicated by the numeral 26. The element 25 may also, as illustrated, be formed with a portion 25c extending from the opposite side of the axis of the shaft 21, said part 25c being bent relative to part 25a so as to be disposed in a plane at an angle to the plane of the part 25a. The part 25c may also, as shown, be formed with straight peripheral edges 25d, 25e and 25f; the peripheral edges 25d and 25f being angularly disposed with reference to the peripheral edge 25e.

From the foregoing it will be seen that both parts 25a and 25c of the element 25 are laterally offset with respect to the center of rotation 26 so as to extend transversely of said center of rotation, and that the plane of the part 25c is disposed at an angle to the plane of the part 25a.

Examples of other forms which the rotatable steering control element may take in accordance with my invention are shown in Figures 4, 5, 6, 7 and 11.

Figure 4:
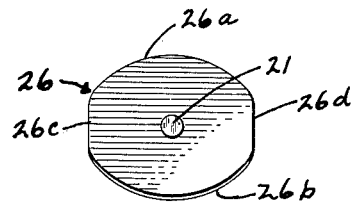
Figure 4 is a view showing a rotatable steering control member and its shaft mounting, according to one embodiment of the invention, the view being taken looking toward one end of the shaft.
Figure 5:
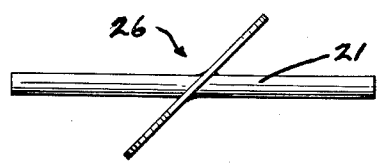
Figure 5 is a view taken at right angles to the showing of Figure 4.

In Figures 4 and 5 the rotatable steering control element is shown in the form of a flat disc 26 having peripheral edge portions 26a and 26b which are curved and having intermediate straight peripheral edge portions 26c and 26d. The steering control element 26 is shown as mounted on the shaft 21 at an oblique angle thereto.

Figure 6:
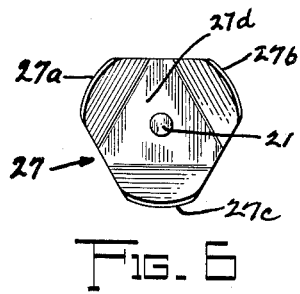
Figure 6 is a view showing another modification of the steering control member and its shaft mounting, looking toward the end of the shaft.
Figure 7:
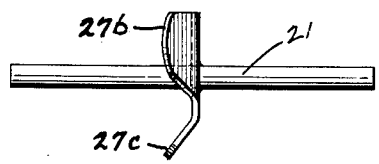
Figure 7 is a view taken at right angles to the showing of Figure 6.

In Figures 6 and 7 there is shown a rotatable steering control element which also may be formed of a flat piece of sheet metal. This rotatable element is generally designated 27 and may be of somewhat dished formation as shown with curved or petal like portions 27a, 27b and 27c angularly disposed with reference to a relatively flat central portion 27d, the plane of which is substantially disposed in the plane of the center of rotation when this element is mounted on the shaft 21.

Figure 10:
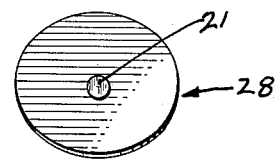
Figure 10 is a view showing still another modification of the rotatable steering member and its shaft mounting, looking toward the end of the shaft.
Figure 11:
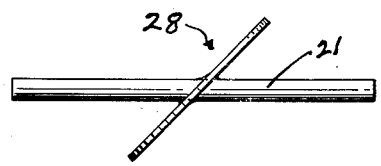
Figure 11 is a view taken at right angles to the showing of Figure 10.

In Figures 10 and 11 there is shown another modified form of the rotatable steering control element generally designated 28, the same being in the form of a flat disc of somewhat elliptical configuration and adapted to be mounted upon the shaft 21 at an oblique angle with respect thereto, as best illustrated by Figure 11.

The rotatable steering control elements 25, 26, 27 and 28 may each be mounted permanently on a respective shaft 21 so that when it is desired to utilize a different form of rotatable steering element in the vehicle, the shaft 21 may be removed therefrom and another shaft 21 bearing the desired form of rotatable steering control element substituted therefor in the vehicle. It will be apparent, of course, that the rotatable steering control element may take many other different forms other than those specifically shown in the drawings and that the same may be mounted upon their respective shafts 21 at varying degrees of obliqueness, relative to the shaft, so as to differently affect the steering operation of the vehicle in which they are incorporated.

It will be noted that in each instance the steering control element in respect to any of the forms 25, 26, 27 and 28, the said elements have parts which extend between the fork extensions 20 and which are laterally offset from the center of rotation or which extend transversely of the center of rotation, when cooperatively assembled in the vehicle, and when said element rotates in the operation of the vehicle said parts laterally offset from the center of rotation or extending transversely of the center of rotation coact periodically with one or the other of the extensions 20 during the rotation of the control element to steerably move the front running gear about the vertical axis of the pivot 18.

In the operation of the vehicle embodying my variable self-steering means of my invention, it will be understood that the motor 10, upon being wound by the key 11, will serve to propel the vehicle through the driving wheels 4 and the motor will also function to rotate the rotatable steering control element 25, 26, 27 or 28, around the axis of the shaft 21 so that the parts of said rotatable steering control element laterally offset from the center of rotation or extending transversely of the center of rotation will coact periodically with one or the other of the extensions 20 during rotation of the control element to steerably move the front running gear about the vertical axis of the pivot pin 18, in one direction or the other, whereby to effect steering of the vehicle in a devious path and the particular course of movement will be determined by the specific construction of the rotatable steering control element that is used. Thus, for example, an elliptical disc such as provided by the steering control element 28 mounted at an oblique angle on the shaft 21 will serve to steer the vehicle in a devious course of movement which may be described as a series of shifting figure 8 courses.

On the other hand, a rotatable steering control element of the construction of that shown in Figures 8 and 9 will serve to steer the vehicle in a rectangular course.

One advantage of the use of the steering means of the invention is that the vehicle may be made to stay within prescribed boundaries so that when a space of the proper size is cleared a vehicle will not run into walls, furniture or other obstacles.

It will be apparent that an endless amount of amusement may be derived from an almost infinite variety of courses over which the vehicle may be caused to be steered, dependent upon the particular construction of the rotatable steering control elements employed.

The spring clutch type wheel mounting illustrated in Figure 3 is advantageous in that when the vehicle meets with an obstacle in its path such as to stop its movement, the spring 9 will yield to permit the axle 3 to turn relative to wheels 4 and thereby permit the motor spring 10 to unwind so that it is not maintained under tension unduly with consequent detrimental effect thereon. Similarly, when an electric motor is used, this wheel mounting is effective to permit the motor to operate after the wheels are stopped, so as to avoid burning out the motor which might otherwise occur.

Having thus described my invention, what I claim as new and desire to secure by Letters Patent of the United States is:

1. In a self-propelled vehicle, in combination, a frame, running gear mounted at the rear end of the frame, steerable running gear steerably mounted at the front end of the frame, a motor mounted on the frame and operatively connected with the rear running gear for propelling the vehicle, a pair of transversely spaced extensions rigidly carried by the front running gear, a rotatable steering control element rotatably mounted on the frame, means operatively connecting said motor and said element for rotating the latter, said element being constructed and arranged to engage periodically with one or the other of said extensions during rotation of said element to steerably move the front running gear.

2. In a self-propelled vehicle, in combination, a frame, running gear mounted at the rear end of the frame, steerable running gear steerably mounted at the front end of the frame, a motor mounted on the frame and operatively connected with the rear running gear for propelling the vehicle, a rotatable steering control element rotatably mounted on the frame, means operatively connecting said motor and said element for rotating the latter, and a pair of transversely spaced extensions rigidly carried by the front running gear, said control element being arranged to extend between said extensions and constructed to periodically engage with one or the other of said extensions during rotation of said control element to steerably move the front running gear.

3. In a self-propelled vehicle, in combination, a frame, running gear mounted at the rear end of the frame, steerable running gear steerably mounted at the front end of frame, a motor mounted on the frame and operatively connected with the rear running gear for propelling the vehicle, a shaft mounted on the frame and extending transversely thereof, a rotatable steering control element mounted on said shaft to rotate about the axis thereof, means operatively connecting said motor and said element for rotating the latter, and a pair of extensions rigidly carried by the front running gear and spaced transversely of the frame, said control element being arranged to extend between said extensions and having parts extending transversely of the center of rotation of the control element, said parts being arranged to engage periodically with one or the other of said extensions during rotation of said control element to steerably move the front running gear.

4. In a self-propelled vehicle, in combination, a frame, running gear mounted at the rear end of the frame, a steerable running gear steerably mounted at the front end of frame, a motor mounted on the frame and operatively connected with the rear running gear for propelling the vehicle, a shaft mounted on the frame and extending transversely thereof, a rotatable disc mounted on said shaft at an oblique angle thereto, means operatively connecting said motor and said disc for rotating the latter, and a pair of extensions rigidly carried by the front running gear and spaced transversely of the frame, said disc arranged to extend between said extensions and constructed to engage periodically with one or the other of said extensions during rotation of said disc to steerably move the front running gear.

5. In a self-propelled vehicle, in combination, a frame, running gear mounted at the rear end of the frame, steerable running gear steerably mounted at the front end of the frame, a motor mounted on the frame and operatively connected with the rear running gear for propelling the vehicle, a shaft mounted on the frame and extending transversely thereof, a rotatable element mounted on said shaft, said element having portions extending at an oblique angle to the shaft, means operatively connecting said motor and said element for rotating the latter, and a pair of extensions rigidly carried by the front running gear and spaced transversely of the frame, said element arranged to extend between said extensions and constructed to engage periodically with one or the other of said extensions during rotation of said element to steerably move the front running gear.

References Cited in the file of this patent

UNITED STATES PATENTS

| Number | Name | Date |
|---|---|---|
| 147,503 | Johnson | Feb. 17, 1874 |
| 728,597 | McFarland | May 19, 1903 |
| 1,332,545 | Filippis | Mar. 2, 1920 |
| 1,357,491 | Filippis | Nov. 2, 1920 |
| 1,360,676 | Orkin | Nov. 30, 1920 |
| 1,756,539 | Filippis | Apr. 29, 1930 |
| 1,791,401 | Compton | Feb. 3, 1931 |

FOREIGN PATENTS

| 414,259 | Italy | July 11, 1946 |